UNITED STATES PATENT OFFICE.

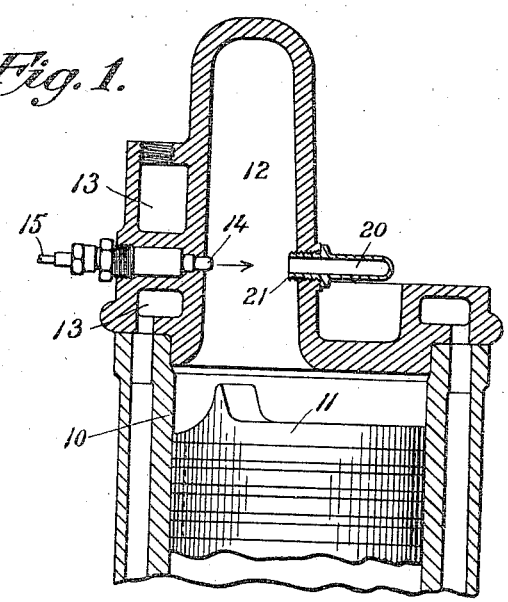
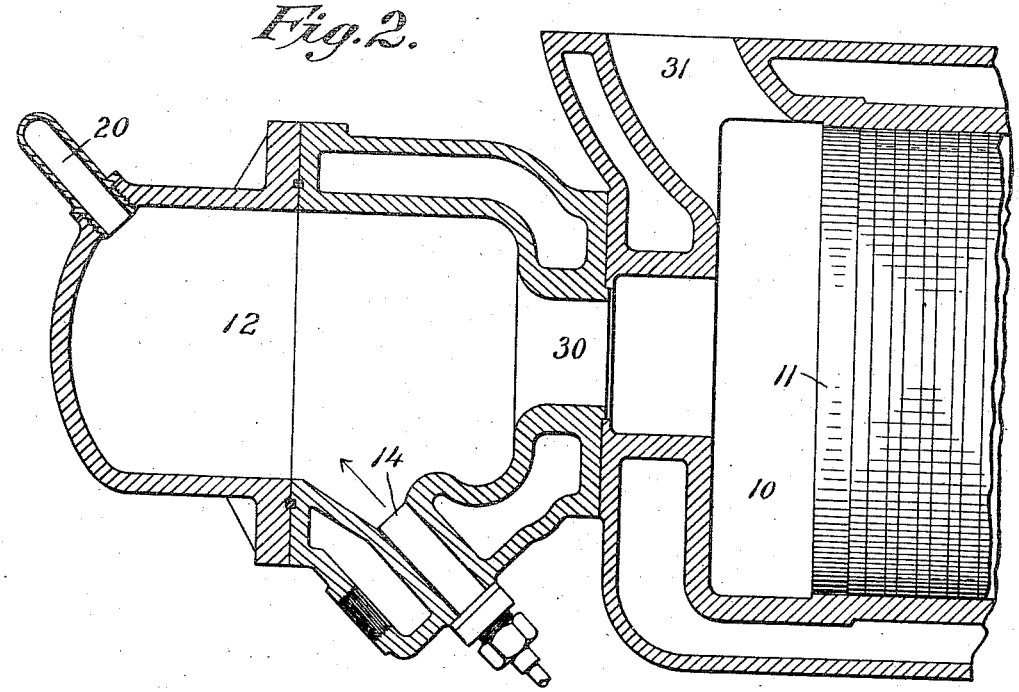

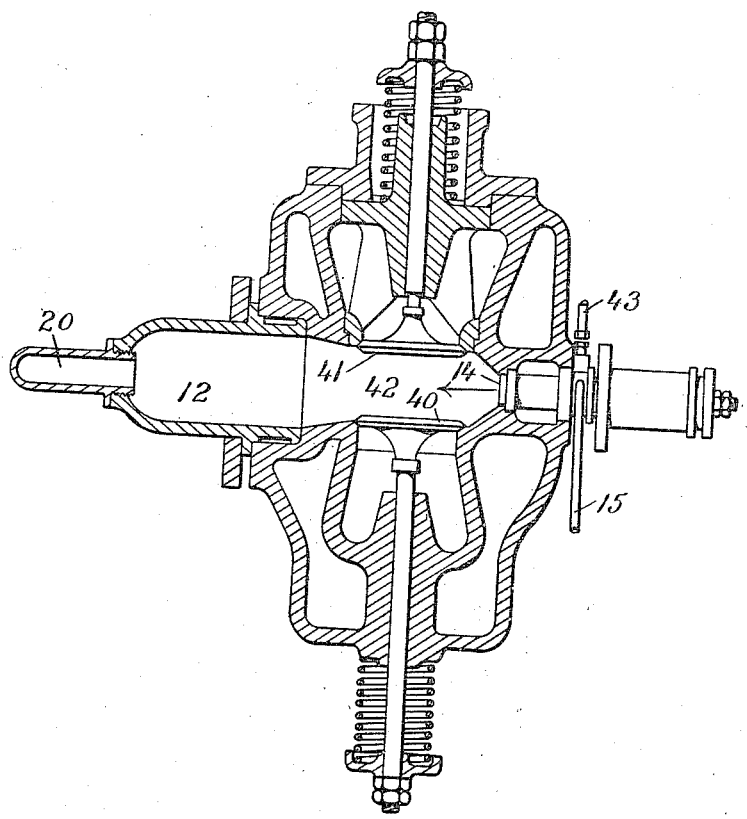

ALFRED LEBRECHT, OF NEW YORK, N. Y., ASSIGNOR TO DE LA VERGNE MACHINE COMPANY, OF NEW YORK, N. Y., A CORPORATION OF NEW YORK.

OIL-ENGINE AND VAPORIZER THEREFOR.

1,049,374.          Specification of Letters Patent.     Patented Jan. 7, 1913.

Application filed March 30, 1910. Serial No. 552,423.

*To all whom it may concern:*

Bt it known that I, ALFRED LEBRECHT, a subject of the German Emperor, residing at New York city, county of New York, and State of New York, have invented certain new and useful Improvements in Oil-Engines and Vaporizers Therefor, fully described and represented in the following specification and the accompanying drawings, forming a part of the same.

This invention relates to oil engines and vaporizers therefor.

More particularly the invention relates to engines and vaporizers of the hot surface vaporizer type, in which the oil, such as kerosene, distillate, and crude or residuum oil, is sprayed or atomized into a hot vaporizing chamber in which the oil is vaporized and mixed with air which is compressed into the chamber to form an explosive mixture which is then ignited by the heat of the walls of the chamber together with the heat of compression. In starting an engine of this type, it is necessary to first heat the wall of the vaporizing chamber with a blow lamp or other suitable means to raise it to sufficient heat to vaporize the oil and ignite the explosive mixture, and this preheating of the vaporizer of engines as heretofore built requires considerable time because of the size of the vaporizing chamber and the necessary thickness of the wall. After the vaporizer has been heated and the engine is running, the compression and explosion of the air and oil vapor mixture serve to maintain the vaporizer walls at the required high temperature. Much difficulty has been experienced in building engines of this type due to the impossibility of designing a hot surface vaporizer which will operate to best advantage under different loads on the engine. Vaporizers having a relatively small heating surface remain sufficiently hot at light load or no load, but become overheated at full load. On the other hand, vaporizers having a relatively large heating surface will maintain the proper temperature when the engine is running at full or heavy load, but are liable to become too cool for proper operation with the engine running under light or no load. Vaporizers with comparatively large surface designed for conditions of approximately full load have proved most successful in practice heretofore, but in addition to the difficulty of their cooling down at no load or light load, they require a longer time for preheating in starting.

The object of the present invention is to avoid the difficulties above referred to and to provide a vaporizer for oil engines which shall operate equally well for all loads and by which the time for preheating at starting shall be largely reduced.

To these ends, the invention consists in providing a main vaporizing chamber having a large surface, that is, one designed for operation with the engine running at full or heavy load, into which chamber the oil to be vaporized is injected in the form of a spray from a suitable spray nozzle or atomizer, and a relatively small secondary vaporizing chamber which opens to the main chamber and which is located to receive a portion of the oil injected by the spray nozzle or atomizer. By this arrangement, proper vaporizing and igniting temperature is insured at all loads on the engine, and quick preheating for starting is secured.

As a full understanding of the invention can best be given by a detailed description of a construction embodying the same, such a description will now be given in connection with the accompanying drawings showing the invention as applied to three known forms of oil engines of the hot surface vaporizer type.

In said drawings:—Figure 1 is a sectional view of a cylinder and vaporizer of a two-cycle vertical engine provided with a vaporizer made in accordance with the present invention. Fig. 2 is a similar view of a four-cycle engine of the Hornsby-Akroyd type provided with a vaporizer made in accordance with the present invention, and Fig. 3 is a sectional view through the exhaust and air inlet valves and the vaporizing chamber of a high pressure four-cycle engine of well known form, modified to embody the present invention.

Referring to the drawings, Fig. 1 shows a power cylinder 10 and piston 11 of a two-cycle engine. A large-surface vaporizing and igniting chamber 12, that is, one designed to maintain the desired temperature of its hot surface with the engine running at or near full load, opens to the end of the cylinder 10 and is partly water cooled by water flowing through the channels 13. The oil to be vaporized is injected into the chamber 12 through a spray nozzle or atomizer 14 by means of a pump or other suitable supplying device connected to the pipe 15. Opening into the main vaporizing chamber 12, is a smaller secondary vaporizing and igniting chamber 20 open to the interior of the main chamber at a point in the wall thereof opposite to and in line with the spray nozzle so that a portion of the oil from the nozzle will enter the secondary chamber and that when the engine is running at light or no load and only a small amount of oil is injected most of it will enter the secondary chamber. The secondary chamber is preferably of cylindrical form with a depth considerably greater than its diameter, and is preferably entered through an opening in the wall of the main chamber, as by being threaded to screw into a threaded opening in said wall, and the inner end of the casing of the secondary chamber preferably projects inward a short distance beyond the inner face of the wall of the main chamber, as indicated at 21. For starting the engine from cold condition, the small vaporizing chamber only is heated with a blow lamp or otherwise, and only two or three minutes are required for raising the walls of the chamber to the necessary high temperature. As the chamber is small, its walls may be made thinner than the walls of a large chamber, and this thinness of the walls further lessens the time required for raising the same to the necessary high temperature. When the small chamber 20 has been sufficiently heated, oil is injected from the spray nozzle 14, and, entering the small chamber, is vaporized, and the engine is started in the usual manner. The amount of oil injected will be regulated in the usual manner according to the speed and load on the engine. When the engine is running at light load or no load, only a small amount of oil is injected, but most of it enters the small vaporizing chamber 20, and combustion of the explosive mixture in the small chamber keeps its walls at the required red heat, even though the main or large vaporizing chamber becomes rather cool. At heavier load or full load, more oil is injected and the main or large vaporizing chamber comes into service, becoming hotter with increased load, but, because of its large surface, never becoming overheated. When the engine is running at heavy load, the small vaporizing chamber does not become excessively heated, but is, on the contrary, cooler than when the engine is running at light or no load. With the engine running at light or no load, therefore, the vaporization and ignition are accomplished by the small vaporizer, and with the engine running at heavier load the vaporization and ignition are performed by the large vaporizer, and this shifting of function between the large and small vaporizing chambers is accomplished automatically and without any adjustment. It is found in practice that the operation is most perfect when the walls of the small vaporizing chamber project a short distance inward beyond the inner wall of the large vaporizing chamber as shown. The form and relative size of the small vaporizing chamber may be varied widely, but its size should be such that its walls will be maintained at the desired high temperature when the engine is running at light load or no load, and a chamber of elongated cylindrical shape, as shown, is found to answer the purpose well, and its outwardly extending portion renders it readily heated by the blow lamp or otherwise in starting. In the operation of the particular form of engine illustrated in this figure, each inward movement of the engine piston is a compression movement, pressing air into the main vaporizing chamber 12, and the oil is injected from the spray nozzle at the end of such compression movement of the piston and is immediately vaporized and mixes with the compressed air to form the explosive mixture which is then immediately ignited by the heat from the walls of the vaporizer and the hot compressed air, aided in this particular form of engine by the shock incident to the sudden change in the direction of the piston.

Referring to Fig. 2, the invention is here shown as applied to a four-cycle engine of the Hornsby-Akroyd type. The main, large-surface vaporizing and igniting chamber 12 as shown in this figure is connected with the engine cylinder 10 by means of a restricted opening 30; the spray nozzle 14 is set at an angle to throw the spray toward the outer end of the vaporizing chamber; and the secondary, small-surface vaporizing and igniting chamber 20 is shown as of the same form as shown in Fig. 1 and mounted in an opening in the wall of the main chamber at a point opposite to the spray nozzle and in line therewith. The small vaporizing chamber is heated for starting the engine and operates as described in connection with Fig. 1 for vaporizing and igniting when the engine is running at light load or no load, and the main vaporizing chamber comes into operation as the load is increased. In the operation of the engine shown in this figure, the first outstroke of the piston 11 after the products of combustion of the previous explosion have been exhausted through the exhaust and intake passage 31 serves to draw fresh air into the cylinder through the passage 31, and during this period of air suction oil is injected through the spray nozzle. By the return stroke of the piston, the passage 31 having been closed, the air is compressed and forced through the passage 30 into the vaporizing chambers to mix with the oil vapor therein. The explosive mixture formed at the end of the compression stroke is ignited by the hot walls of the vaporizing chambers coupled with the heat of compression, the small vaporizing chamber operating at light and no loads and the large chamber at heavy loads. The working stroke of the piston follows ignition; and at the next return, or fourth stroke of the cycle, the products of combustion are expelled through the passage 31. The amount of oil injected by the spray nozzle will be varied as before according to the speed of the engine, and, therefore, according to its load.

Fig. 3 shows the application of the invention to a well known form of high-pressure four-cycle engine. This figure shows the exhaust valve 40 and the air inlet valve 41 opening to a chamber 42 which communicates with the engine cylinder. The main or large-surface vaporizing and igniting chamber 12 opens out from one side of the valve chamber 42, and the spray nozzle 14 injects the oil from the opposite side of the chamber 42 through this chamber and into the vaporizing chamber 12. The small secondary vaporizing and igniting chamber 20 is mounted in and projects outward from the outer end of the main vaporizing chamber, and, as in the other views, is opposite to and in line with the spray nozzle so as to receive a portion of the injected oil, and when only a small quantity of oil is being injected to receive the main portion thereof. The engine, of which the valves and valve chambers, oil injector and vaporizer are shown in this figure, operates on the four-cycle principle as explained in connection with Fig. 2; but instead of having the oil injected during the suction stroke of the working piston, the oil is injected as the compression stroke of the piston is completed, and the oil, which is supplied from an oil pump through the pipe 15, is injected with the aid of compressed air supplied through a pipe 43. This oil injecting and spraying device is of known construction and forms no part of the present invention, and is therefore not described or shown in detail.

It will be understood that the three well known forms of engines shown in the drawings, and which are shown and described only so far as is necessary to give a full understanding of the present invention, are selected merely to show examples of preferred applications and embodiments of the invention, and that the invention may be embodied in or used in connection with other forms of engines of the hot surface vaporizer type to which it may be found applicable. It will be understood also that the invention is not to be limited to the exact forms of vaporizers shown, but that it includes other modifications thereof within the claims.

What is claimed is:—

1. In an oil engine, the combination with a working cylinder and piston, of a vaporizing and igniting chamber in communication with the working cylinder and having an uncooled vaporizing and igniting wall, means for injecting oil into said vaporizing and igniting chamber, and a second vaporizing and igniting chamber opening into the first said chamber in position to receive only a small part of the injected oil when the engine is running at and near full load and to receive most of the injected oil when the engine is running at light or no load.

2. In an oil engine, the combination with a working cylinder and piston, of a main large-surface vaporizing and igniting chamber in communication with the working cylinder and having an uncooled wall for vaporizing the oil and igniting the explosive mixture when the engine is running at and near full load, means for injecting oil into said vaporizing and igniting chamber, and a secondary small-surface vaporizing and igniting chamber opening to the main vaporizing chamber in position to receive only a small part of the injected oil when the engine is running at and near full load and to receive most of the injected oil when the engine is running at light or no load.

3. In an oil engine, the combination with a working cylinder and piston, of a vaporizing and igniting chamber in communication with the working cylinder and having an uncooled wall for vaporizing the oil and igniting the explosive mixture when the engine is running at and near full load, means for injecting oil into said vaporizing and igniting chamber, and a second smaller vaporizing and igniting chamber opening to the first said chamber in position to receive a part of the injected oil and to receive most of the injected oil when the engine is running at light or no load, said second vaporizing and igniting chamber having its walls projecting inward beyond the inner surface of the wall of the first said chamber.

4. In an oil engine, the combination with a working cylinder and piston, of a vaporizing and igniting chamber in communication with the working cylinder and having an uncooled wall for vaporizing the oil and igniting the explosive mixture when the engine is running at and near full load, means for injecting oil into said vaporizing and igniting chamber, and a second smaller vaporizing and igniting chamber opening into the first said chamber in position to receive only a small part of the injected oil when the engine is running at and near full load and to receive most of the injected oil when the engine is running at light or no load, and having its walls projecting outward from the wall of the first said chamber so as to be readily heated from the outside.

5. In an oil engine, the combination with a working cylinder and piston, of a vaporizing and igniting chamber in communication with the working cylinder and having an uncooled wall for vaporizing the oil and igniting the explosive mixture when the engine is running at and near full load, means for injecting oil into said vaporizing and igniting chamber, and a second smaller vaporizing and igniting chamber formed by a cylindrical casing open at one end and closed at the other end, and having its open end entered through an opening in the uncooled wall of the first said chamber in position to receive only a small part of the injected oil when the engine is running at and near full load and to receive most of the injected oil when the engine is running at light or no load.

6. In an oil engine, the combination with a working cylinder and piston, of a main large-surface vaporizing and igniting chamber in communication with the working cylinder and having an uncooled wall for vaporizing the oil and igniting the explosive mixture when the engine is running at and near full load, a secondary small-surface vaporizing and igniting chamber in communication with the working cylinder for vaporizing the oil and igniting the explosive mixture when the engine is running at light or no load, and means for injecting oil into said vaporizing and igniting chambers.

7. In an oil engine, the combination with a working cylinder and piston, of a main large-surface vaporizing and igniting chamber in communication with the working cylinder and having an uncooled wall for vaporizing the oil and igniting the explosive mixture when the engine is running at and near full load, a secondary small-surface vaporizing and igniting chamber in communication with the working cylinder through the main vaporizing and igniting chamber for vaporizing the oil and igniting the explosive mixture when the engine is running at light or no load, and means for injecting oil into said vaporizing chambers.

8. A vaporizer for oil engines comprising a main vaporizing and igniting chamber having an uncooled wall for vaporizing the oil and igniting the explosive mixture when the engine is running at and near full load, and a secondary smaller vaporizing and igniting chamber opening into the main vaporizing and igniting chamber in position to receive only a small part of the injected oil when the engine is running at and near full load and to receive most of the injected oil when the engine is running at light or no load.

9. A vaporizer for oil engines comprising a main vaporizing and igniting chamber having an uncooled wall for vaporizing the oil and igniting the explosive mixture when the engine is running at and near full load, means for injecting oil into said chamber, and a secondary smaller vaporizing and igniting chamber formed by a casing secured to and projecting outward from the uncooled wall of the main vaporizing and igniting chamber and opening into the main vaporizing and igniting chamber in position to receive only a small part of the injected oil when the engine is running at and near full load and to receive most of the injected oil when the engine is running at light or no load.

10. A vaporizer for oil engines comprising a main vaporizing and igniting chamber having an uncooled wall for vaporizing the oil and igniting the explosive mixture when the engine is running at and near full load, a spray nozzle for injecting oil into said chamber, and a secondary smaller vaporizing and igniting chamber opening into the main vaporizing and igniting chamber through the uncooled wall of said main chamber on the side of the main chamber opposite to and in line with the spray nozzle, the mouth of the secondary chamber projecting inward from the wall of the main chamber.

11. A vaporizer for oil engines comprising a main large-surface vaporizing and igniting chamber having an uncooled wall for vaporizing the oil and igniting the explosive mixture when the engine is running at and near full load, a spray nozzle for injecting oil into said chamber, and a secondary small-surface vaporizing and igniting chamber opening into the main vaporizing and igniting chamber through its uncooled wall on the side of the chamber opposite to and in line with the spray nozzle, the parts being so proportioned and arranged that the secondary vaporizing and igniting chamber will receive a small part only of the injected oil when the engine is running at and near full load and will receive most of the injected oil when the engine is running at light or no load.

In testimony whereof, I have hereunto set my hand, in the presence of two subscribing witnesses.

ALFRED LEBRECHT.

Witnesses:
LAURA E. SMITH,
A. L. KENT.